(12) United States Patent
Kamiya et al.

(10) Patent No.: US 10,778,889 B2
(45) Date of Patent: Sep. 15, 2020

(54) IMAGE PICKUP APPARATUS, VIDEO SIGNAL PROCESSING APPARATUS, AND VIDEO SIGNAL PROCESSING METHOD

(71) Applicant: SONY CORPORATION, Tokyo (JP)

(72) Inventors: Koji Kamiya, Kanagawa (JP); Yukihiro Kinoshita, Tokyo (JP); Yasutaka Nakashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,391

(22) PCT Filed: Mar. 6, 2018

(86) PCT No.: PCT/JP2018/008570
§ 371 (c)(1),
(2) Date: Aug. 15, 2019

(87) PCT Pub. No.: WO2018/168571
PCT Pub. Date: Sep. 20, 2018

(65) Prior Publication Data
US 2020/0112670 A1    Apr. 9, 2020

(30) Foreign Application Priority Data
Mar. 15, 2017    (JP) ................................ 2017-050649

(51) Int. Cl.
*H04N 5/232* (2006.01)
*H04N 7/015* (2006.01)
(Continued)

(52) U.S. Cl.
CPC ... *H04N 5/23229* (2013.01); *H04N 5/232939* (2018.08); *H04N 5/2628* (2013.01); *H04N 7/015* (2013.01); *H04N 7/0117* (2013.01)

(58) Field of Classification Search
CPC . H04N 5/23229; H04N 7/0117; H04N 5/2628
See application file for complete search history.

(56) References Cited

U.S. PATENT DOCUMENTS

2014/0347557 A1\* 11/2014 Gomita .................. G06T 3/403
348/441
2017/0006256 A1    1/2017 Gomita et al.
2018/0249118 A1    8/2018 Gomita et al.

FOREIGN PATENT DOCUMENTS

CN          104184929 A      12/2014
JP          2005-136456 A    5/2005
(Continued)

OTHER PUBLICATIONS

International Search Report and Written Opinion of PCT Application No. PCT/JP2018/008570, dated May 15, 2018, 08 pages of ISRWO.

(Continued)

*Primary Examiner* — Christopher K Peterson
(74) *Attorney, Agent, or Firm* — Chip Law Group

(57) ABSTRACT

This image pickup apparatus includes a VF signal processing unit 15 that downconverts a first video signal having a 4K resolution to thereby generate an downconverted video signal having an HD resolution, calculates each of pieces of differential data from an average luminance value of luminance values of 2 horizontal×2 vertical pixels of a center portion in a region of 4 horizontal×4 vertical pixels of a first video signal, which correspond to 2 horizontal×2 vertical pixels of the downconverted video signal, calculates an addition value for each pixel of 2 horizontal×2 vertical pixels of the center portion on the basis of each piece of differential data, and individually adds the luminance values of 2 horizontal×2 vertical pixels of the downconverted video signal to thereby generate a second video signal having the HD resolution.

15 Claims, 15 Drawing Sheets

(51) Int. Cl.
  *H04N 7/01*    (2006.01)
  *H04N 5/262*   (2006.01)
  *G06T 3/40*    (2006.01)
  *G03B 17/18*   (2006.01)
  *G03B 13/02*   (2006.01)
  *H04N 1/393*   (2006.01)
  *H04N 1/387*   (2006.01)

(56) References Cited

FOREIGN PATENT DOCUMENTS

| JP | 2007-336257 A | 12/2007 |
| JP | 2011-130112 A | 6/2011 |
| JP | 2011-135170 A | 7/2011 |
| JP | 5490514 B2 | 5/2014 |
| JP | 2014-230176 A | 12/2014 |
| KR | 10-2011-0073159 A | 6/2011 |

OTHER PUBLICATIONS

Extended European Search Report of EP Application No. 18767380.1, dated Feb. 7, 2020, 06 pages.

* cited by examiner

Arrangement of 4K video pixels

Band-limiting
(cutting high frequency components)

Band-limited 4K video pixels

Resolution conversion (thinning)

Arrangement of downconverted video pixels 4K video pixel array

Downconvert

HD video pixel array 4K video pixel array

Downconvert

HD video pixel array

IMAGE PICKUP APPARATUS, VIDEO SIGNAL PROCESSING APPARATUS, AND VIDEO SIGNAL PROCESSING METHOD

CROSS REFERENCE TO RELATED APPLICATIONS

This application is a U.S. National Phase of International Patent Application No. PCT/JP2018/008570 filed on Mar. 6, 2018, which claims priority benefit of Japanese Patent Application No. JP 2017-050649 filed in the Japan Patent Office on Mar. 15, 2017. Each of the above-referenced applications is hereby incorporated herein by reference in its entirety.

TECHNICAL FIELD

The present technology relates to an image pickup apparatus such as a video camera and a video signal processing apparatus and a video signal processing method to be used for the image pickup apparatus or the like.

BACKGROUND ART

An image pickup pixel number of a video camera has been increasing. In recent years, there are also many cameras having an image pickup pixel number of 4K (3840×2160). In contrast, regarding a view finder installed in the video camera, one having a screen size of about 10 inches at most is mainly employed. Therefore, reducing the size by downconversion or the like to thereby display captured video on the view finder or cutting signals corresponding to a screen resolution of the view finder from the captured video to thereby display it on the view finder has been performed (see Patent Literature 1).

CITATION LIST

Patent Literature

Patent Literature 1: Japanese Patent Application Laid-open No. 2007-336257

DISCLOSURE OF INVENTION

Technical Problem

When the image pickup pixel number of the video camera increases, the accuracy of focus adjustment needs to also increase. However, the video obtained by downconversion has high frequency components removed through a band-limiting filter for removing aliasing noise, and thus visibility in a focus state is not good. Further, in addition to those problems, there are various problems needed to be solved in an image pickup apparatus including a view finder having a screen resolution lower than the image pickup pixel number.

An object of the present technology relates to an image pickup apparatus, a video signal processing apparatus, and a video signal processing method, which enable focus adjustment while visually recognizing display video on a view finder to be favorably performed.

Solution to Problem

In order to solve the above-mentioned problem, an image pickup apparatus which is a first embodiment according to the present technology includes:

an image pickup unit including an image pickup element;

a first video signal processing unit that generates a first video signal having a first resolution from a pixel signal obtained by the image pickup unit;

a second video signal processing unit that downconverts the first video signal generated by the first video signal processing unit to thereby generate a downconverted video signal having a second resolution lower than the first resolution, sets respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels, and individually adds a value according to differential data from an average luminance value of the center portion pixels in each region, which is a luminance representative value of the one or more center portion pixels corresponding to each pixel of the downconverted video signal, to a luminance value of a corresponding pixel of the downconverted video signal, to thereby generate a second video signal having the second resolution; and a view finder that displays the second video signal.

The second video signal processing unit may be configured to multiply each of pieces of differential data by a predetermined gain to thereby calculate an addition value for each pixel of 2 horizontal×2 vertical pixels of the center portion.

The second video signal processing unit may be configured to band-limit the first video signal and perform downconverting by pixel thinning.

The luminance representative value can include an average value of luminances of one or more center portion pixels corresponding to each pixel of 2 horizontal×2 vertical pixels in the downconverted video signal.

The second video signal processing unit may be configured to generate data, which is obtained by multiplying the differential data by a predetermined gain, as the value according to the differential data.

The image pickup apparatus according to the present technology may include:

an operation element group including a first operation element capable of selecting the number of center portion pixels in a first axis direction as a first setting value and a second operation element capable of selecting the number of center portion pixels in a second axis direction as a second setting value; and a control unit that detects respective states of the first operation element and the second operation element at a time of image pickup and reflects the first setting value and the second setting value to an operation of the second video signal processing unit on the basis of the detection result in real time.

The operation element group may further include a third operation element capable of selecting a value of the gain as a third setting value, in which the control unit may be configured to detect a state of the third operation element at the time of image pickup and reflect the third setting value to an operation of the second video signal processing unit on the basis of the detection result in real time.

The image pickup apparatus according to the present technology may further include a user interface for assigning the first operation element, the second operation element, and the third operation element in the operation element group.

Further, the second video signal processing unit may be configured to calculate a value, which is obtained by multiplying data obtained by subtracting a certain value as an absolute value from each piece of differential data by a predetermined gain, as the value according to the differential data.

The second video signal processing unit may be configured to clip each piece of differential data with an arbitrary value as an absolute value when subtracting a certain value as an absolute value from each piece of differential data.

A video signal processing apparatus which is a second embodiment of according to the present technology includes:

a first video signal processing unit that generates a first video signal having a first resolution from a pixel signal obtained by an image pickup apparatus; and a second video signal processing unit that downconverts the first video signal generated by the first video signal processing unit to thereby generate a downconverted video signal having a second resolution lower than the first resolution, sets respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels, and individually adds a value according to differential data from an average luminance value of the center portion pixels in each region, which is a luminance representative value of the one or more center portion pixels corresponding to each pixel of the downconverted video signal, to a luminance value of a corresponding pixel of the downconverted video signal, to thereby generate a second video signal having the second resolution.

A video signal processing method according to the present technology includes:

generating, by a first video signal processing unit, a first video signal having a first resolution from a pixel signal obtained by an image pickup apparatus; and downconverting, by a second video signal processing unit, the first video signal generated by the first video signal processing unit to thereby generate a downconverted video signal having a second resolution lower than the first resolution, setting respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels, and individually adding a value according to differential data from an average luminance value of the center portion pixels in each region, which is a luminance representative value of the one or more center portion pixels corresponding to each pixel of the downconverted video signal, to a luminance value of a corresponding pixel of the downconverted video signal, to thereby generate a second video signal having the second resolution.

Advantageous Effects of Invention

As described above, in accordance with the present technology, it is possible to favorably perform focus adjustment while viewing display video on a view finder.

MODE(S) FOR CARRYING OUT THE INVENTION

Hereinafter, embodiments according to the present technology will be described with reference to the drawings.

First Embodiment

Figure 1:
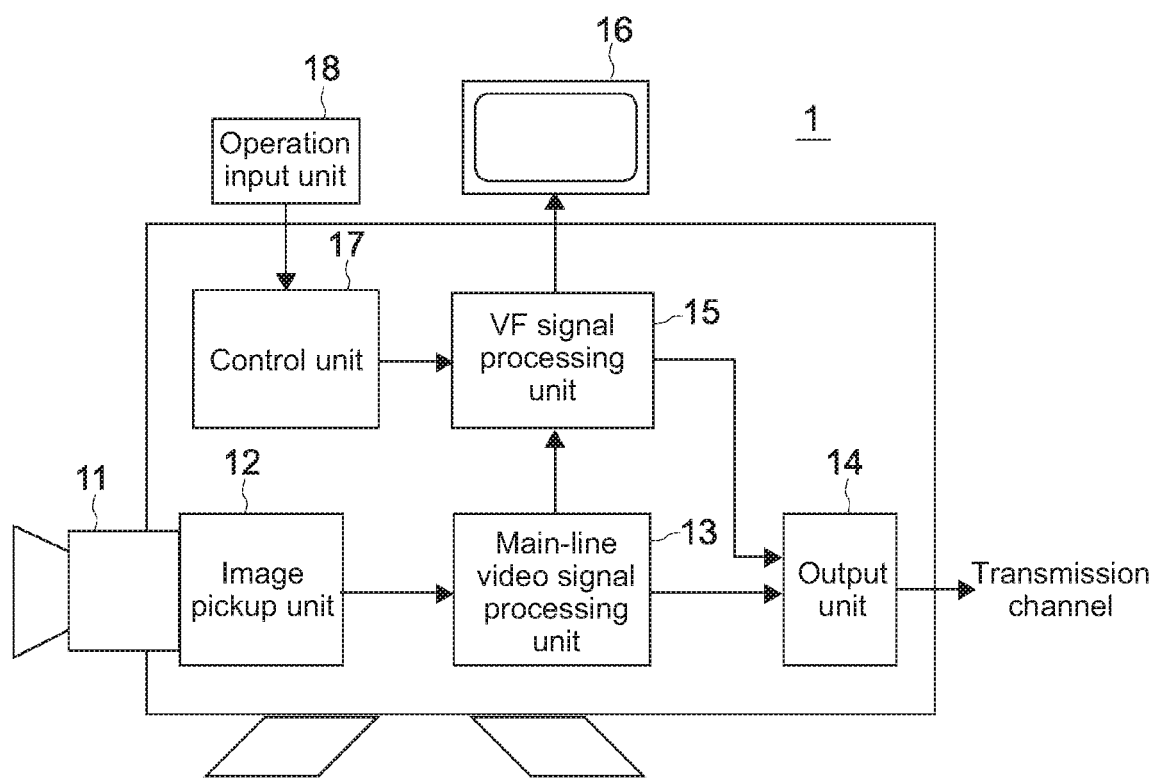
FIG. 1 A region diagram showing a configuration of an image pickup apparatus of a first embodiment according to the present technology.

FIG. 1 is a region diagram showing a configuration of an image pickup apparatus of a first embodiment according to the present technology.

This image pickup apparatus 1 includes an optical block 11, an image pickup unit 12, a main-line video signal processing unit 13, an output unit 14, a VF signal processing unit 15, a view finder (VF) 16, a control unit 17, and an operation input unit 18.

The optical block 11 includes a lens, a focus adjustment mechanism, a shutter mechanism, a diaphragm (iris) mechanism, and the like. The optical block 11 images reflection light from an object to be imaged on an imaging plane of an image pickup element of the image pickup unit 12 through a lens.

The image pickup unit 12 includes an image pickup element, an analog signal processing circuit, an A/D conversion circuit, and the like. The image pickup element includes a charge coupled device (CCD) image sensor, a complementary metal oxide semiconductor (CMOS) image sensor, and the like. The image pickup element includes, for example, 4K (3840×2160), 8K (7680×4320), and the like, and has a relatively large effective pixel number. A pixel signal obtained by the image pickup element of the image pickup unit 12 is supplied to the main-line video signal processing unit 13.

The main-line video signal processing unit 13 corresponds to the "first video signal processing unit" in the scope of claims and generates a first video signal having a first resolution corresponding to an effective pixel number of the image pickup element by performing signal processing such as defect correction, noise cancel, lens aberration correction, A/D conversion, RAW phenomenon, and the like, for example, on the pixel signal supplied by the image pickup unit 12. The first video signal is a video signal having a relatively high resolution, for example, a 4K video signal, an 8K video signal, or the like. It should be noted that in the present specification, the description will be continued assuming a case where the 4K video signal is generated. The generated first video signal is supplied to the output unit 14 and the VF signal processing unit 15.

The output unit 14 performs processing of transmitting the first video signal obtained by the main-line video signal processing unit 13 to a video device outside a camera control unit (CCU) and the like through a camera cable. In the CCU, processing or the like of receiving the first video signal and the like transmitted through a camera cable 30 from the image pickup apparatus 1, converting it into a digital video signal or an analog video signal in format suitable for transmission, for example, and transmitting it is performed.

It should be noted that the first video signal obtained by the main-line video signal processing unit 13 may be recorded on a recording medium such as a solid state drive (SSD).

The VF signal processing unit 15 corresponds to the "second video signal processing unit" in the scope of claims and generates a VF video signal as the second video signal having the second resolution which is a screen resolution of the VF 16 from the first video signal having the first resolution which is obtained by the main-line video signal processing unit 13.

The VF 16 includes a screen on which the VF video signal can be displayed.

The operation input unit 18 receives inputs of instructions, various settings, and the like for operating the image pickup apparatus 1 from the user and includes a button, a switch, a dial, a touch panel sensor provided in the screen of the VF 16, and the like, for example.

The control unit 17 is a controller for controlling the respective units of the image pickup apparatus 1 and includes a central processing unit (CPU), a random access memory (RAM), and a read only member (ROM), and the like. Programs, various parameters and the like to be executed by the CPU are stored in the RAM or the ROM. The control unit 17 interprets information of an operation input of the user which is received in the operation input unit 18 and controls the image pickup apparatus 1 in accordance with the interpreted input information.

Next, details of the above-mentioned VF signal processing unit 15 will be described.

Figure 2:
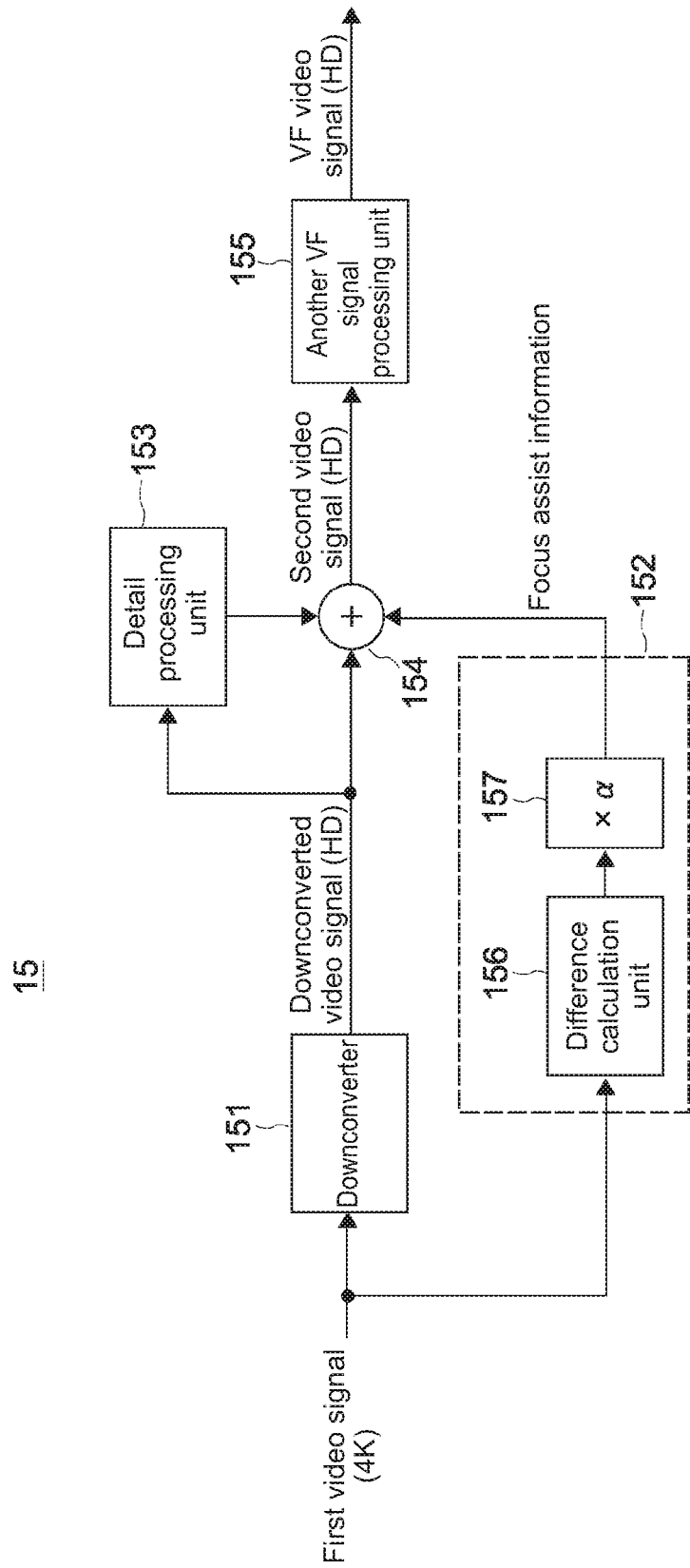
FIG. 2 A region diagram showing a functional configuration of a VF signal processing unit 15 in the image pickup apparatus 1 of FIG. 1.

FIG. 2 is a region diagram showing a functional configuration of the VF signal processing unit 15.

The VF signal processing unit 15 includes a downconverter 151, a focus assist information generation unit 152, a detail processing unit 153, an addition unit 154, and another VF signal processing unit 155.

The downconverter 151 converts an input first video signal having a first resolution into a downconverted video signal having a second resolution lower than the first resolution by downconversion. More specifically, the downconverter 151 removes high frequency components from the first video signal through the band-limiting filter for cancelling aliasing noise and converts 4 pixels of 2 vertical×2 horizontal pixels, for example, into 1 pixel by pixel thinning. With this configuration, the downconverter 151 converts a video signal having a 4K resolution into a downconverted video signal (second video signal) having an HD resolution, for example.

The focus assist information generation unit 152 includes a difference calculation unit 156 and a gain unit 157.

The difference calculation unit 156 sets respective pixels of 2 horizontal pixels or more×2 vertical pixels or more of a center portion in a region of 2N horizontal×2N vertical pixels (N is a power of 2 which is equal to or larger than 2) such as 4 horizontal×4 vertical pixels, for example, of the first video signal which correspond to 2 horizontal×2 vertical pixels of the downconverted video signal as center portion pixels. Then, the difference calculation unit 156 calculates differential data from an average luminance value of a luminance representative value of the one or more center portion pixels corresponding to each pixel of 2 horizontal×2 vertical pixels in the downconverted video signal. Here, the average luminance value is an average value of luminance values of the respective center portion pixels. The luminance representative value is an average value of luminance values of the one or more center portion pixels corresponding to the each pixel of 2 horizontal×2 vertical pixels in the downconverted video signal.

The gain unit 157 generates focus assist information by multiplying each piece of differential data calculated by the difference calculation unit 156 by a certain gain ($\alpha$).

The addition unit 154 adds, to a luminance value of the each pixel of the downconverted video signal generated by the downconverter 151, the corresponding focus assist information generated by the focus assist information generation unit 152, to thereby generate a second video signal having the second resolution with the luminance contrast being further increased. The generated second video signal is subjected to other signal processing such as synthesis of character and maker by the other VF signal processing unit 155 and is supplied to the VF 16 as the VF video signal having the second resolution.

The detail processing unit 153 performs detail processing of emphasizing the contour of the object to be imaged with respect to the downconverted video signal having the second resolution which is generated by the downconverter 151.

It should be noted that the detail processing unit 153 is turned on/off in accordance with a control instruction from the control unit 17.

In the above-mentioned configuration of the image pickup apparatus 1, the main-line video signal processing unit 13 and the VF signal processing unit 15 correspond to a "video signal processing apparatus" according to the present technology in the scope of claims.

(Description of Generation Operation of VF Video Signal)

Next, a generation operation of the VF video signal by the image pickup apparatus 1 of this embodiment will be described with reference to FIGS. 3A, 3B, 3C, 4, 5, 6, and 7.

(Operation and Problem of Downconverter 151)

First of all, an operation of the downconverter 151 in the above-mentioned VF signal processing unit 15 will be first described.

It should be noted that in this operation example, a case where the resolution of the first video signal is 4K and the resolution of the second video signal is HD is assumed.

Figure 3A:
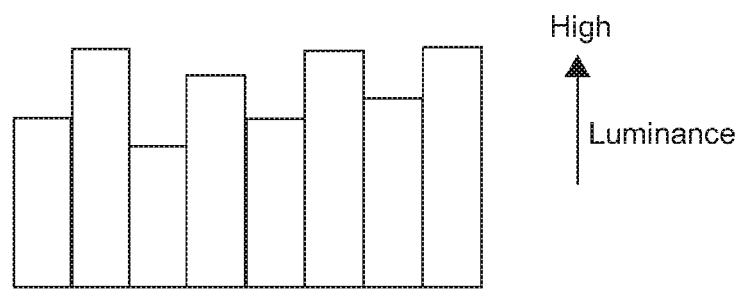
FIGS. 3A, 3B, and 3C The diagrams showing resolution conversion by a downconverter 151 in a two dimensional space of luminance and arrangement of pixels in one direction.
Figure 3B:
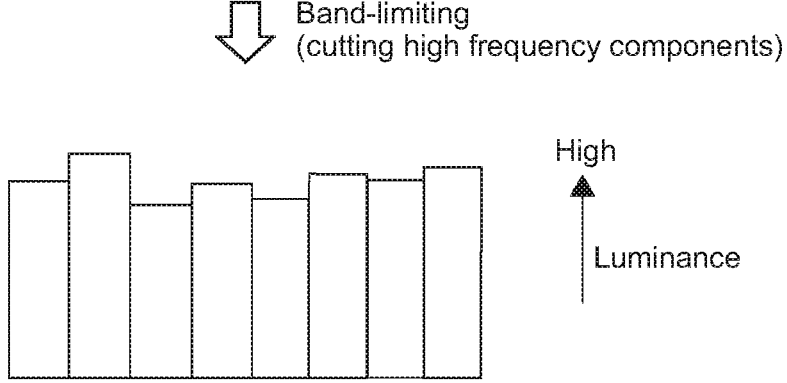
Figure 3C:
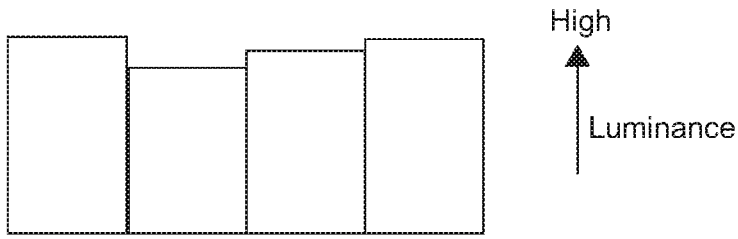
Figure 4:
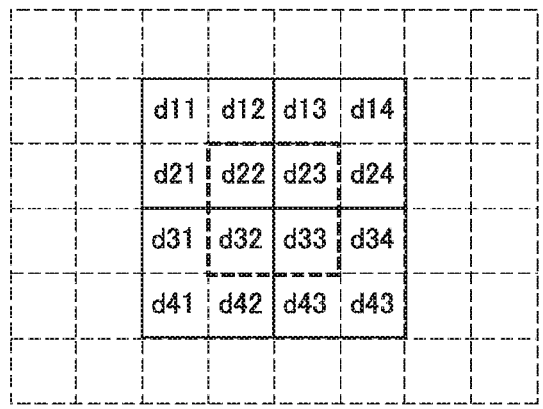
FIG. 4 A diagram showing resolution conversion by the downconverter 151 from a video signal having a 4K resolution to a video signal having an HD resolution in a vertical and horizontal pixel array space.
Figure 4:
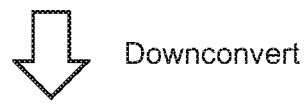
Figure 4:
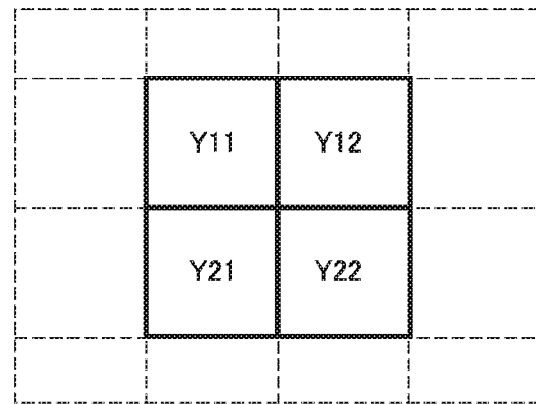

FIGS. 3A, 3B, and 3C are diagrams showing resolution conversion by the downconverter 151 in a two dimensional space of luminance and arrangement of pixels in one direction. FIG. 4 is a diagram showing resolution conversion by the downconverter 151 in a vertical and horizontal pixel array space.

For cancelling aliasing noise, the downconverter 151 limits high frequency components from the first video signal having the 4K resolution (FIG. 3A) through the band-limiting filter (FIG. 3B) and generates a video signal having the HD resolution (FIG. 3C) by resolution conversion (pixel thinning). The conversion from the 4K resolution into the HD resolution is performed by thinning the 4 pixels of 2 vertical×2 horizontal pixels into the 1 pixel as shown in FIG. 4.

Figure 5:
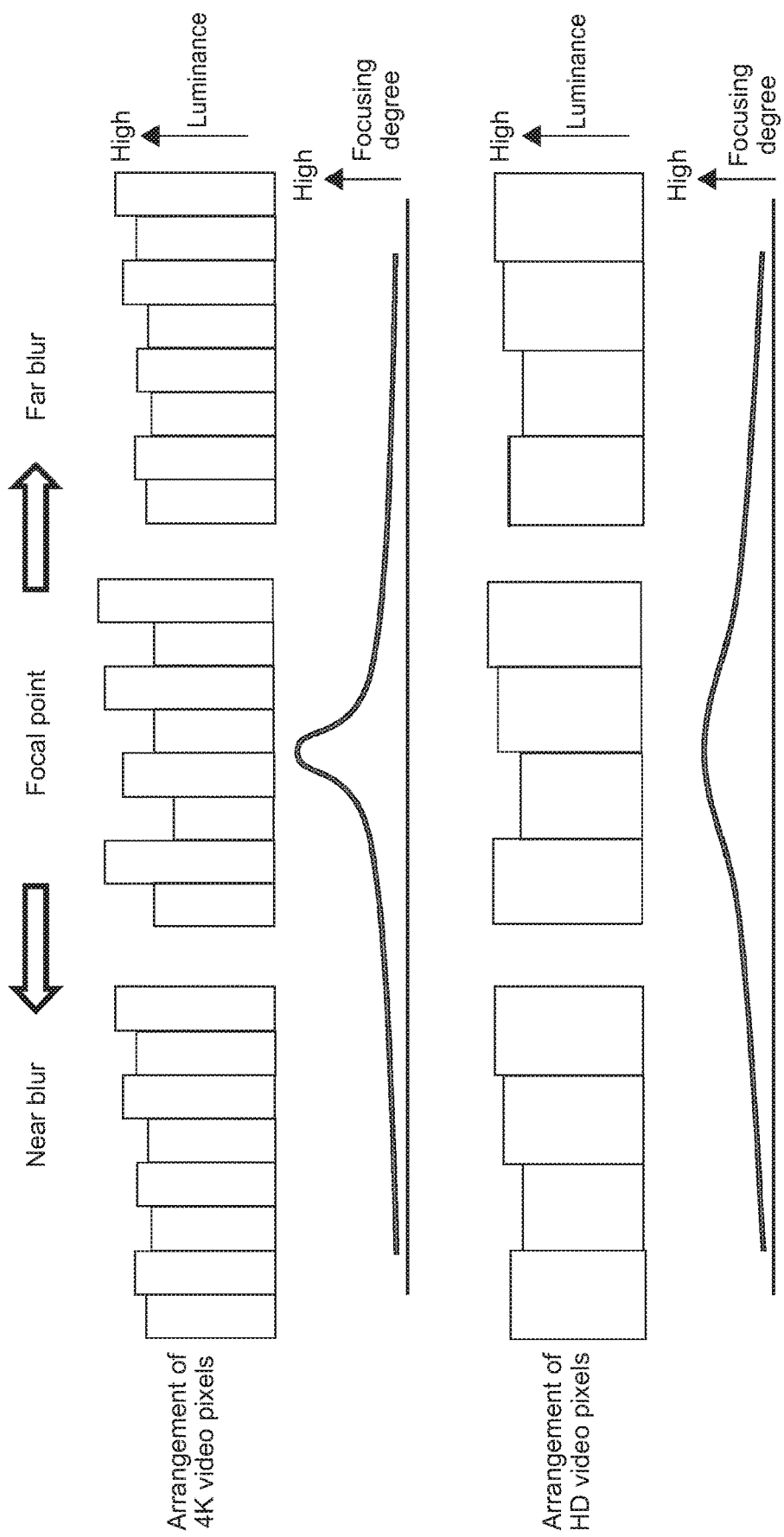
FIG. 5 A diagram showing a difference in focal point peak appearance between a video signal having a 4K resolution and a video signal having an HD resolution.

The video signal having the HD resolution which is obtained by downconversion in this manner has high frequency components removed. Therefore, a focal point peak appears more gently as compared to the video signal having the 4K resolution before conversion as shown in FIG. 5, and it becomes difficult to perform focusing correspondingly. The image pickup apparatus 1 of this embodiment is configured to generate each piece of focus assist information corresponding to each pixel of the downconverted video signal from the first video signal having the 4K resolution and individually add it to the luminance value of each pixel of the downconverted video signal having the HD resolution which is obtained by downconverting the first video signal having the 4K resolution to thereby generate a second video signal having an HD resolution with the luminance contrast being further increased. Hereinafter, that operation will be described.

(Operation of Focus Assist Information Generation Unit 152)

Figure 6:
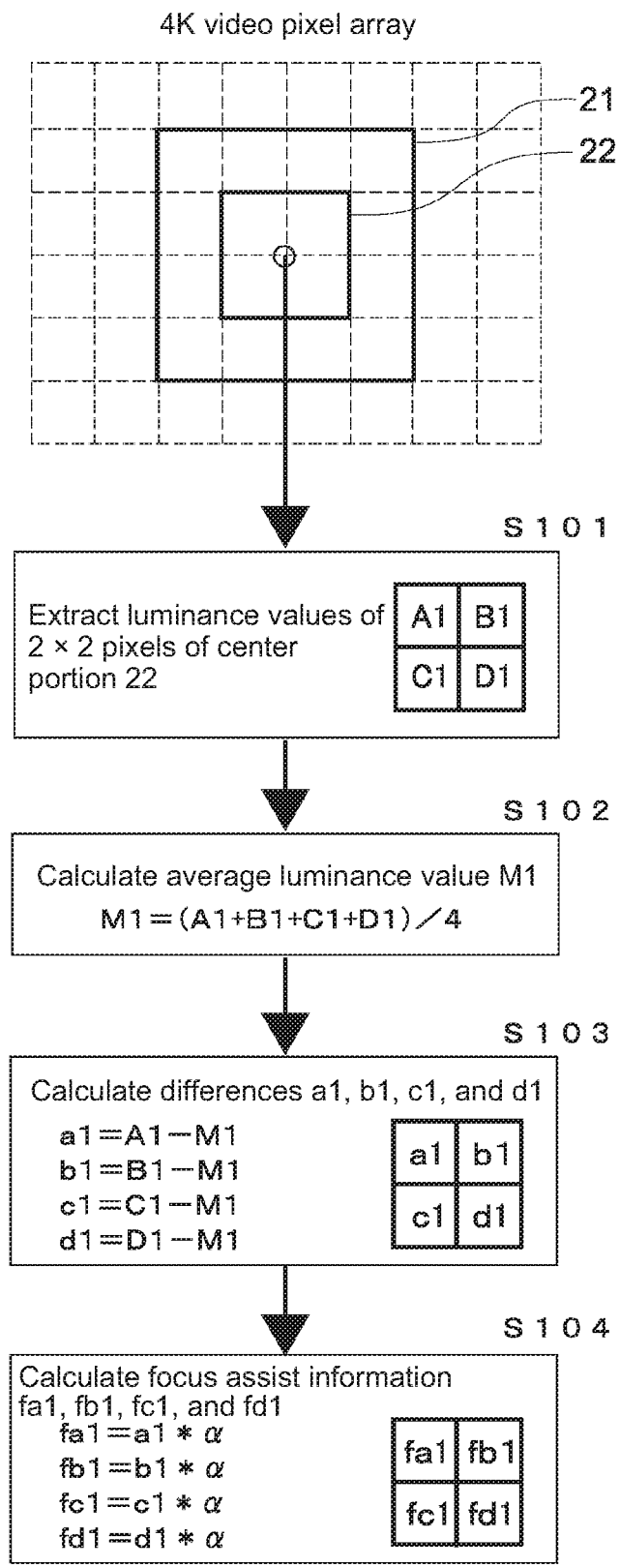
FIG. 6 A flowchart showing a procedure of generation of focus assist information.

FIG. 6 is a flowchart showing a generation procedure of the focus assist information.

In the focus assist information generation unit 152, the difference calculation unit 156 first extracts luminance values of 4 pixels (center portion pixels) of 2 horizontal×2 vertical, for example, of a center portion 22 in a region 21 of 4 horizontal×4 vertical pixels of the first video signal having the 4K resolution which correspond to 2 horizontal×2 vertical pixels of the downconverted video signal having the HD resolution (Step S101) and calculates an average luminance value M1 of the respective luminance values in accordance with the following Expression (1) (Step S102).

$$M1=(A1+B1+C1+D1)/4 \quad (1)$$

Where A1, B1, C1, D1 are respective luminance values of the 4 pixels (center portion pixels) of the center portion 22 in the region 21 of 4 horizontal×4 vertical pixels of the first video signal.

Next, the difference calculation unit 156 sets the respective luminance values A1, B1, C1, and D1 of the 4 pixels (center portion pixels) as luminance representative values of the center portion pixels corresponding to the each pixel of 2 horizontal×2 vertical pixels in the downconverted video signal and calculates pieces of differential data a1, b1, c1, and d1 from the average luminance value M1 with respect to the respective luminance representative values A1, B1, C1, and D1 as in the following Expression (2) (Step S103).

$$a1=A1-M1$$
$$b1=B1-M1$$
$$c1=C1-M1$$
$$d1=D1-M1 \quad (2)$$

Next, the gain unit 157 multiplies each piece of differential data a1, b1, c1, and d1 by a certain gain $\alpha$ and generates pieces of focus assist information fa1, fb1, fc1, and fd1 (Step S104).

$$fa1=a1*\alpha$$
$$fb1=b1*\alpha$$
$$fc1=c1*\alpha$$
$$fd1=d1*\alpha \quad (3)$$

The pieces of focus assist information fa1, fb1, fc1, and fd1 generated by the focus assist information generation unit 152 in this manner are respectively individually added to values of pixels Y11, Y12, Y21, and Y22 (see FIG. 4) of the downconverted video signal having the HD resolution which is generated by the downconverter 151 by the addition unit 154.

Figure 7:
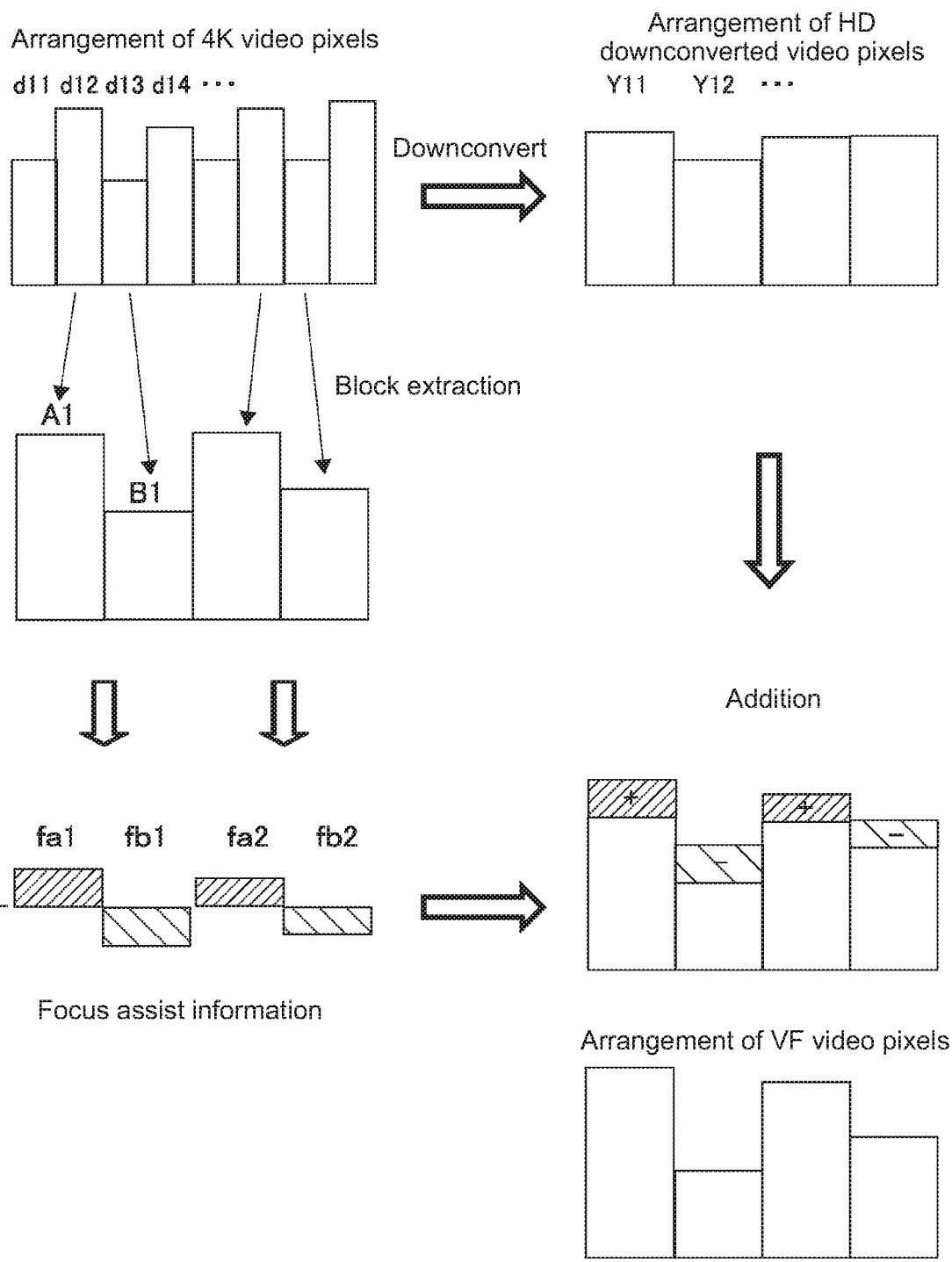
FIG. 7 A diagram showing processing until a VF video signal having an HD resolution is generated from a first video signal having the 4K resolution in a two dimensional space of luminance and arrangement of pixels in one direction.

FIG. 7 is a diagram showing processing until the VF video signal having the HD resolution is generated from the first video signal having the 4K resolution in a two dimensional space of luminance and arrangement of pixels in one direction.

It should be noted that in the figure, two pieces of focus assist information fa1 and fb1 and two pieces of focus assist information fa2 and fb2 generated from the subsequent region out of the pieces of focus assist information fa1, fb1, fc1, and fd1 shown in FIG. 6 which are generated by the focus assist information generation unit 152 from the first video signal having the 4K resolution are described.

In the example of FIG. 7, the focus assist information fa1 is a positive value. Therefore, it is added by the addition unit 154 with respect to the value of the pixel Y11 corresponding to the downconverted video signal. Further, the focus assist information fb1 is a negative value. Therefore, it is subtracted by the addition unit 154 with respect to a value of a pixel Y12 corresponding to the downconverted video signal. Therefore, the VF video signal having the HD resolution with the luminance contrast between the pixels being increased can be obtained and the focus adjustment by visual recognition can be more favorably performed on the screen of the VF 16.

Other Operation Example

In the description operation above, the differential data from the average luminance value of the respective luminance values is calculated with respect to the 4 pixels of 2 horizontal×2 vertical pixels of the center portion in the region of 4 horizontal×4 vertical pixels of the first video signal having the 4K resolution which correspond to 2 horizontal×2 vertical pixels of the downconverted video signal having the HD resolution. The present technology is not limited thereto.

For example, the present technology can also be applied to a case where the resolution of the first video signal is 8K and the resolution of the second video signal is 4K. In this case, with respect to 4 pixels of 2 horizontal×2 vertical pixels of a center portion in a region of 4 horizontal×4 vertical pixels of a first video signal having an 8K resolution which correspond to 2 horizontal×2 vertical pixels of the downconverted video signal having the 4K resolution, it is only necessary to calculate the differential data from the average luminance value using the respective luminance values as the luminance representative values to thereby generate focus assist information and add it to each of 2 horizontal×2 vertical pixels of the downconverted video signal having the 4K resolution.

Further, the present technology can also be applied to a case where the resolution of the first video signal is 8K and the resolution of the second video signal is HD. In this case, with respect to 4 pixels of 2 horizontal×2 vertical pixels of a center portion in a region of 8 horizontal×8 vertical pixels of a first video signal having the 8K resolution which correspond to 2 horizontal×2 vertical pixels of the downconverted video signal having the HD resolution, it is only necessary to calculate differential data from the average luminance value by using the respective luminance values as the luminance representative values to thereby generate focus assist information and add it to each of 2 horizontal×2 vertical pixels of the downconverted video signal having the HD resolution.

In addition, in a case where the resolution of the first video signal is 8K and the resolution of the second video signal is HD, processing may be performed with respect to 16 pixels of 4 horizontal×4 vertical of a center portion in a region of 8 horizontal×8 vertical pixels of the first video signal having the 8K resolution which correspond to 2 horizontal×2 vertical pixels of the downconverted video signal having the HD resolution.

In this case, the difference calculation unit 156 handles four pairs of 4 pixels of 2 horizontal×2 vertical that divide 16 pixels of 4 horizontal×4 vertical of a center portion in vertical and horizontal directions into equal parts as a group of a four pairs of center portion pixels corresponding to the respective pixels in 2 horizontal×2 vertical pixels of the downconverted video signal. The difference calculation unit 156 calculates a luminance representative value for each group of a pair of center portion pixels with respect to the group of the four pairs of center portion pixels corresponding to the respective pixels in 2 horizontal×2 vertical pixels of the downconverted video signal, and calculates differential data from the average luminance value to thereby generate focus assist information.

Figure 8:
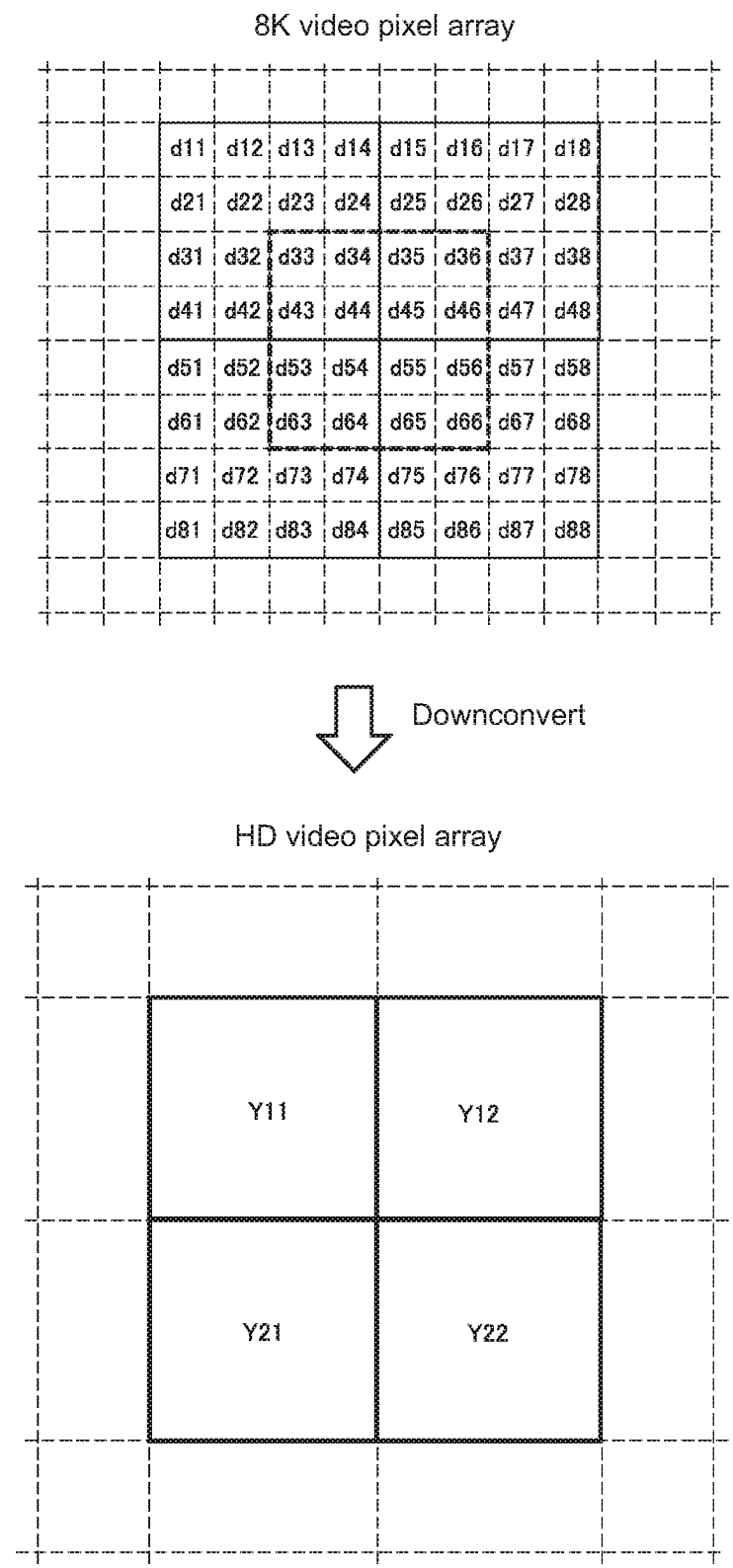
FIG. 8 A diagram showing resolution conversion by the downconverter 151 from a video signal having an 8K resolution to a video signal having an HD resolution.

FIG. 8 is a diagram showing resolution conversion from the first video signal having the 8K resolution into a second video signal having the HD resolution.

The downconverter 151 generates a pixel Y11 in 2 horizontal×2 vertical pixels of a downconverted video signal having the HD resolution from pixels d11 to d14, d21 to d24, d31 to d34, and d41 to d44 of the first video signal having the 8K resolution by pixel thinning. Similarly, the downconverter 151 generates a pixel Y12 in 2 horizontal×2 vertical pixels of the downconverted video signal having the HD resolution from pixels d15 to d18, d25 to d28, d35 to d38, and d45 to d48 of the first video signal having the 8K resolution by pixel thinning. Similarly, the downconverter 151 generates a pixel Y21 in 2 horizontal×2 vertical pixels of the downconverted video signal having the HD resolution from pixels d51 to d54, d61 to d64, d71 to d74, and d81 to d84 of the first video signal having the 8K resolution by pixel thinning. Then, the downconverter 151 generates a pixel Y22 in 2 horizontal×2 vertical pixels of the downconverted video signal having the HD resolution from pixels d55 to d58, d65 to d68, d75 to d78, and d85 to d88 of the first video signal having the 8K resolution by pixel thinning.

Next, the difference calculation unit 156 calculates an average value of luminance values of the center portion pixels d33, d34, d43, and d44 corresponding to the pixel Y11 of the downconverted video signal having the HD resolution as a luminance representative value Ar of the center portion pixels corresponding to the pixel Y11. Similarly, the difference calculation unit 156 calculates an average value of luminance values of the center portion pixels d35, d36, d45, and d46 corresponding to the pixel Y12 as a luminance representative value Br of the center portion pixels corresponding to the pixel Y12. Similarly, the difference calculation unit 156 calculates an average value of luminance values of the center portion pixels d53, d54, d63, and d64 corresponding to the pixel Y21 as a luminance representative value Cr of the center portion pixels corresponding to the pixel Y21. Similarly, the difference calculation unit 156 calculates an average value of luminance values of the center portion pixels d55, d56, d65, and d66 corresponding to the pixel Y22 as a luminance representative value Dr of the center portion pixels corresponding to the pixel Y22.

Next, the difference calculation unit 156 calculates an average value of the luminance representative values Ar, Br, Cr, and Dr as the average luminance value M1.

Next, the difference calculation unit 156 calculates pieces of differential data a1, b1, c1, and d1 from the average luminance value M1 with respect to the respective luminance representative values Ar, Br, Cr, and Dr.

Next, the gain unit 157 multiplies each piece of differential data a1, b1, c1, and d1 by the certain gain α and generates pieces of focus assist information fa1, fb1, fc1, and fd1.

The pieces of focus assist information fa1, fb1, fc1, and fd1 generated by the focus assist information generation unit 152 in this manner are respectively individually added to the luminance values of the pixels Y11, Y12, Y21, and Y22 of the downconverted video signal having the HD resolution which is generated by the downconverter 151 by the addition unit 154.

The present technology can also be applied to a case where the resolution of the first video signal is 8K and the resolution of the second video signal is HD as described above.

In short, the present technology can be applied to a case where the region of the first video signal which corresponds to 2 horizontal×2 vertical pixels of the second video signal is 2N horizontal×2N vertical pixels (N is a power of 2 which is equal to or larger than 2).

Next, the description will be complemented with respect to the plurality of center portion pixels of 2 horizontal pixels or more×2 vertical pixels or more.

In the description above, the case where the plurality of center portion pixels of 2 horizontal pixels or more×2 vertical pixels or more are a total of 4 pixels of 2 horizontal pixels×2 vertical pixels or a total of 16 pixels of 4 horizontal pixels×4 vertical pixels. The present technology can also be applied to a case where those are a total of 9 pixels of 3 horizontal pixels×3 vertical pixels.

Figure 9:
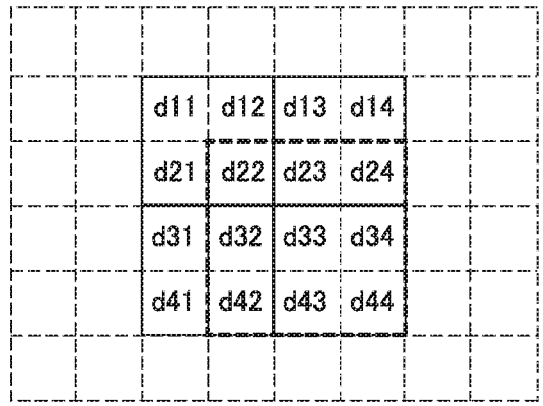
FIG. 9 A diagram showing a case where a plurality of center portion pixels of 2 horizontal pixels or more×2 vertical pixels or more are a total of 9 pixels of 3 horizontal pixels×3 vertical pixels.
Figure 9:
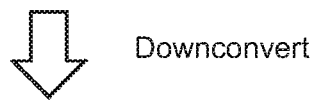
Figure 9:
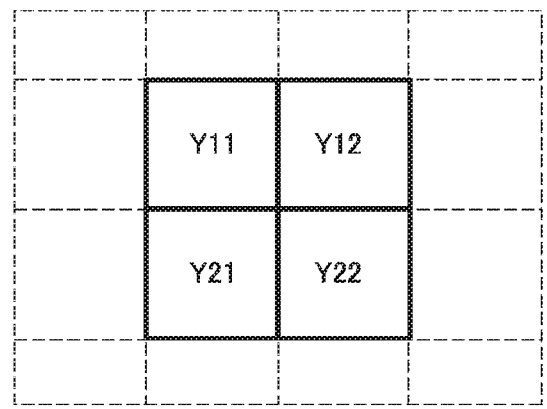

FIG. 9 is a diagram showing a case where the plurality of center portion pixels of 2 horizontal pixels or more×2 vertical pixels or more are the total of 9 pixels of 3 horizontal pixels×3 vertical pixels.

Here, it is assumed that the resolution of the first video signal is 4K and the resolution of the second video signal is HD.

The difference calculation unit 156 extracts luminance values of a total of 9 pixels of 3 horizontal×3 vertical pixels including the respective pixels of the center portion in the region of 4 horizontal×4 vertical pixels of the first video signal having the 4K resolution which correspond to 2 horizontal×2 vertical pixels of the downconverted video signal having the HD resolution.

Next, the difference calculation unit 156 calculates a luminance value of a center portion pixel d22 corresponding to a pixel Y11 of the downconverted video signal having the HD resolution as a luminance representative value Ar of a center portion pixel corresponding to the pixel Y11. Similarly, the difference calculation unit 156 calculates an average value of luminance values of center portion pixels d23 and d24 corresponding to a pixel Y12 as a luminance representative value Br of center portion pixels corresponding to the pixel Y12. Similarly, the difference calculation unit 156 calculates an average value of luminance values of center portion pixels d32 and d42 corresponding to a pixel Y21 as a luminance representative value Cr of center portion pixels corresponding to the pixel Y21. Similarly, the difference calculation unit 156 calculates an average value of luminance values of the center portion pixels d33, d34, d43, and d44 corresponding to a pixel Y22 as a luminance representative value Dr of center portion pixels corresponding to the pixel Y22.

Next, the difference calculation unit 156 calculates an average value of the luminance representative values Ar, Br, Cr, and Dr as the average luminance value M1 and calculates pieces of differential data a1, b1, c1, and d1 from the average luminance value M1 with respect to the respective luminance representative values Ar, Br, Cr, and Dr.

Next, the gain unit 157 multiplies each piece of differential data a1, b1, c1, and d1 by the certain gain α and generates pieces of focus assist information fa1, fb1, fc1, and fd1.

The pieces of focus assist information fa1, fb1, fc1, and fd1 generated by the focus assist information generation unit 152 in this manner are respectively individually added to the values of the pixels Y11, Y12, Y21, and Y22 of the downconverted video signal having the HD resolution which is generated by the downconverter 151 by the addition unit 154.

As described above, the present technology can also be applied to the case where the total of 9 pixels of 3 horizontal pixels×3 vertical pixels are used as the center portion pixels.

Similarly, 5 horizontal pixels or more×5 vertical pixels or more can also be used as the center portion pixels.

In addition, the present technology can be applied not only to a case where vertical and horizontal pixel numbers of the center portion pixels of the first video signal are equal to each other but also to a case where the vertical and horizontal pixel numbers are different from each other, for example, 4 vertical pixels and 2 horizontal pixels.

[User Setting Regarding Focus Assist Function]

The image pickup apparatus 1 of this embodiment can be set by the user as follows regarding the focus assist function.

1. On/off of focus assist

2. Number of vertical center portion pixels (2-n)

3. Number of horizontal center portion pixels (2-m)

4. Gain value

The on/off of the focus assist is a setting to turn on/off the focus assist function.

The number of vertical center portion pixels (2-n) is a setting value of the number of vertical center portion pixels in the region of 2N horizontal×2N vertical pixels (N is a power of 2 which is equal to or larger than 2) of the first video signal which correspond to 2 horizontal×2 vertical pixels of the downconverted video signal.

The number of horizontal center portion pixels (2-m) is a setting value of the number of horizontal center portion pixels in the region of 2N horizontal×2N vertical pixels (N is a power of 2 which is equal to or larger than 2) of the first video signal which correspond to 2 horizontal×2 vertical pixels of the downconverted video signal.

It should be noted that a maximum value n which can be set in the number of vertical center portion pixels (2-n) is a vertical pixel number of the entire region of 2N horizontal×2N vertical pixels (N is a power of 2 which is equal to or larger than 2) of the first video signal which correspond to 2 horizontal×2 vertical pixels of the downconverted video signal.

Further, a maximum value m which can be set in the number of horizontal center portion pixels (2-m) is a horizontal pixel number of the entire region of 2N horizontal×2N vertical pixels (N is a power of 2 which is equal to or larger than 2) of the first video signal which correspond to 2 horizontal×2 vertical pixels of the downconverted video signal.

The gain value is a gain α by which the pieces of differential data a1, b1, c1, and d1 are to be commonly multiplied.

Figure 10:
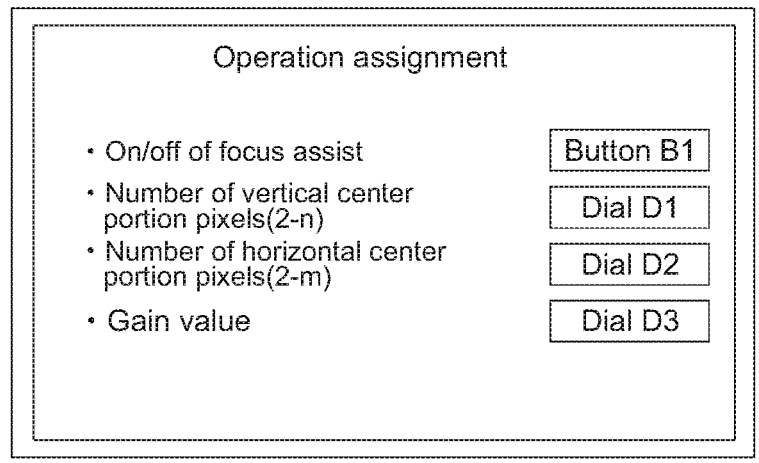
FIG. 10 A diagram showing a UI screen for user settings regarding a focus assist function.

FIG. 10 is a diagram showing a user interface (UI) screen for the above-mentioned user settings.

Regarding this UI, the VF 16 of the image pickup apparatus 1, an external display, or the like is used as a UI display unit, for example, and a particular operation button and the like provided in the image pickup apparatus 1 are used as a setting input unit.

On the UI screen, the operation element assigned for each setting item can be selected by the user from among a group including a plurality of operation elements. The operation element group which can be assigned to the setting items is a particular button group, a dial group, and the like provided in the operation input unit 18 of the image pickup apparatus 1.

Figure 11:
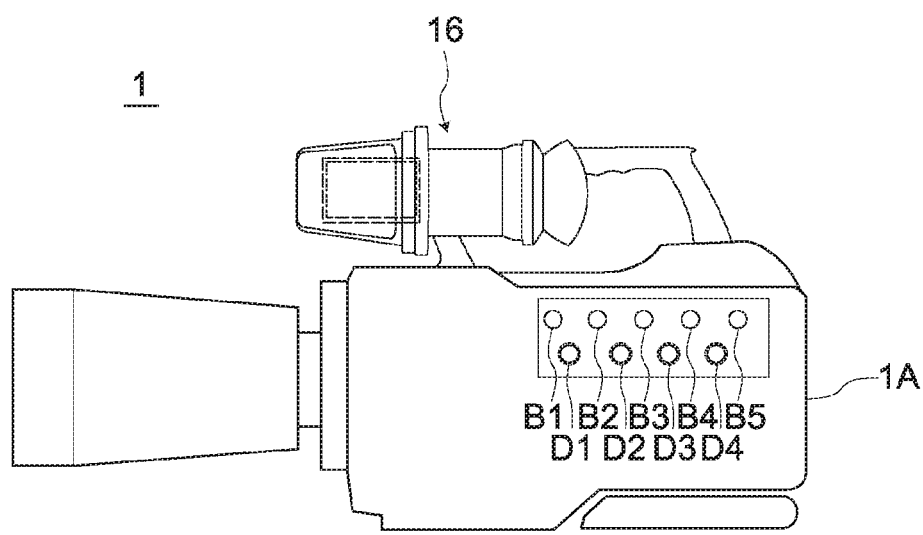
FIG. 11 A side view showing an operation element regarding the focus assist function of the image pickup apparatus 1.

FIG. 11 is a side view showing an operation element regarding the focus assist function of the image pickup apparatus 1. As shown in the figure, the image pickup apparatus 1 includes a plurality of buttons B1, B2, B3, B4, and B5 and a plurality of dials D1, D2, D3, and D4 as the operation element group to which the respective setting items regarding the focus assist function can be assigned.

It should be noted that in this figure, the case where the operation element group is provided on the side surface of the body 1A of the image pickup apparatus 1 is shown, the operation element group may be provided on another surface such as the upper surface or the like of the image pickup apparatus 1 or may be provided on the VF 16.

Next, a method in which the user assigns an arbitrary operation element of the operation element group of the image pickup apparatus 1 to an arbitrary setting item on the UI screen shown in FIG. 10 will be described.

It should be noted that a case where initial values of the operation elements are set to the respective setting items on the UI screen shown in FIG. 10 is assumed. For example, the operation element that is a button B1 is set to the on/off of the focus assist, the operation element that is a dial D1 is set to the number of vertical center portion pixels, the operation element that is a dial D2 is set to the number of horizontal center portion pixels, and the operation element that is a dial D3 is set to the gain value as the respective initial values.

Figure 12:
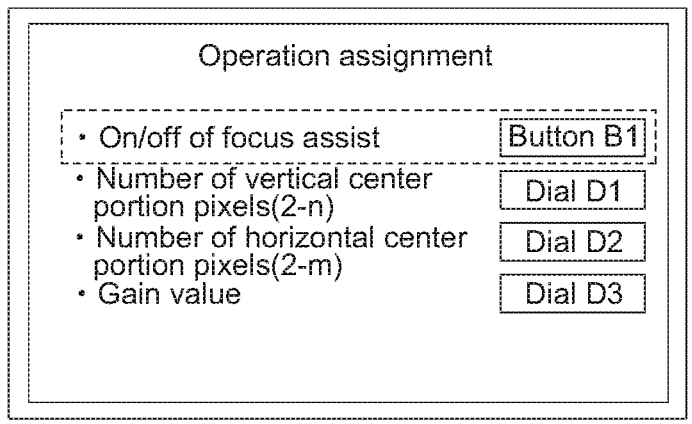
FIG. 12 A diagram showing an operation method in a case of changing an operation element for the number of horizontal center portion pixels from the dial D2 to the dial D3 on the UI screen shown in FIG. 10.
Figure 12:
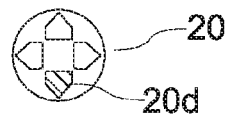
Figure 12:
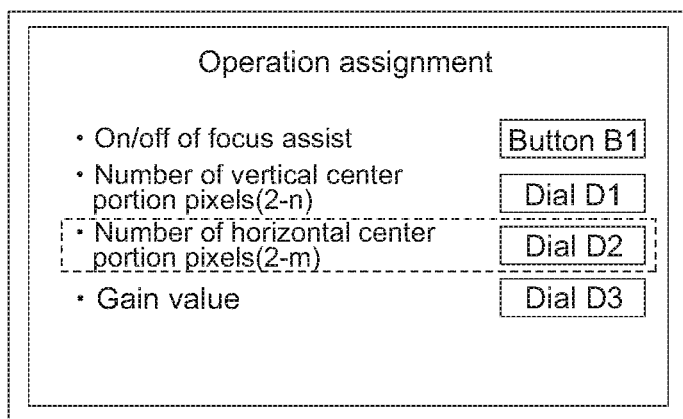
Figure 12:
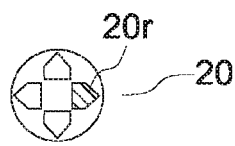
Figure 12:
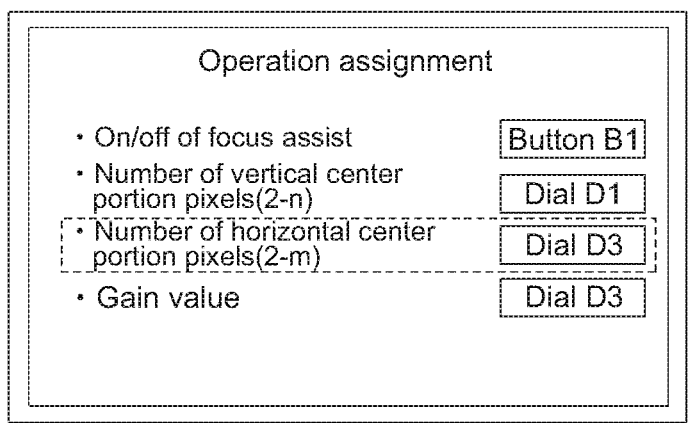

FIG. 12 is a diagram showing an operation method in a case of changing the operation element for the number of horizontal center portion pixels from the dial D2 to the dial D3 on the UI screen shown in FIG. 10.

On the UI screen, the user selects a setting item, whose the operation element wished by the user to change, by operating cursor keys 20 and the like provided in the operation input unit 18, for example. For example, when a down key 20d of the cursor keys 20 is pressed twice, the setting item of the operation element which is a target to be changed moves from the on/off of the focus assist to the number of horizontal center portion pixels. Next, a right key 20r of the cursor keys 20 is pressed once, the display of the operation element with respect to the setting item of the number of horizontal center portion pixels is changed from the dial D2 to the dial D3. With this configuration, the assignment of the operation element with respect to the setting item of the number of horizontal center portion pixels is changed from the dial D2 to the dial D3. It should be noted that when the right key 20r of the cursor keys 20 is pressed twice, the display of the operation element with respect to the setting item of the number of horizontal center portion pixels is changed from the dial D2 to a dial D4. With this configuration, the assignment of the operation element with respect to the setting item of the number of horizontal center portion pixels is changed from the dial D2 to the dial D4. In a similar way, the assignment of operation elements with respect to the other setting items can also be changed.

Figure 13:
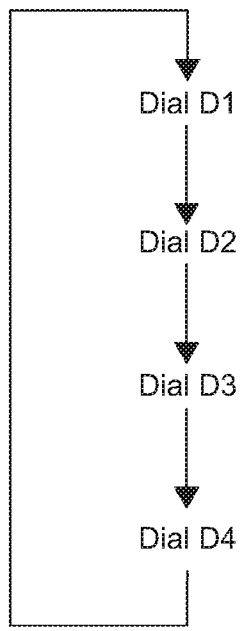
FIG. 13 A diagram showing a switching procedure between a plurality of dials on the UI screen shown in FIG. 10.
Figure 14:
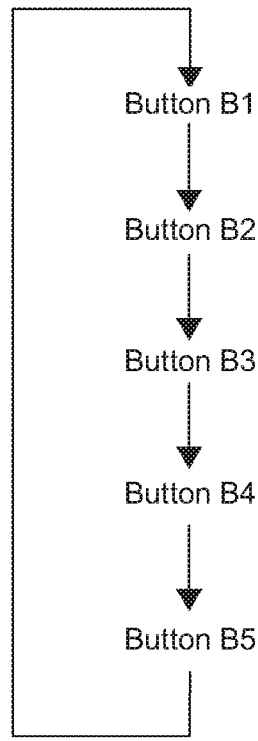
FIG. 14 A diagram showing a switching procedure between a plurality of a plurality of buttons on the UI screen shown in FIG. 10.

FIG. 13 is a diagram showing a switching procedure between the plurality of dials D1 to D4. As it can be seen, in a case where the dial before the setting is changed is the dial D2, the selected dial is switched in the order of the dial D3, the dial D4, and the dial D1 every time the right key 20r of the cursor keys 20 is pressed once. Further, as shown in FIG. 14, the buttons B1 to B5 can also be switched in accordance with a similar rule.

Figure 15:
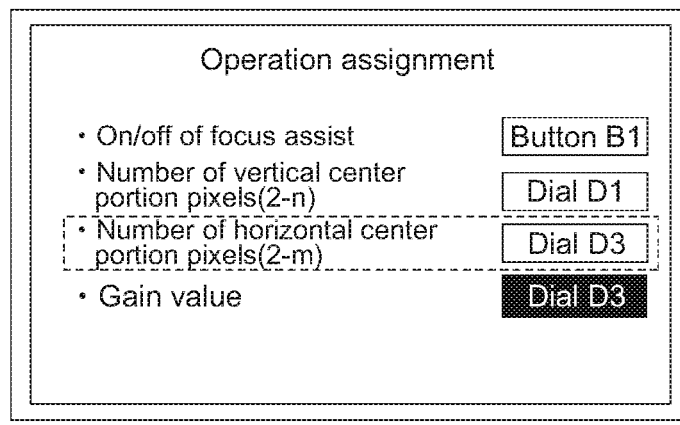
FIG. 15 A diagram showing a display example in a case where a setting in which operation elements overlap occurs on the UI screen shown in FIG. 10.

It should be noted that when the assignment of the operation element with respect to the setting item of the number of horizontal center portion pixels is changed from the dial D2 to the dial D3, it overlaps the operation element assigned to the setting item of the gain value. In a case where the operation elements with respect to the plurality of setting items overlap as such, that operation item is displayed in a state in which it can be identified by reverse display and the like so as to prompt to change the setting of the operation element with respect to the operation item (e.g., the setting item of the gain value) to which that operation element has been assigned as shown in FIG. 15. With this configuration, the user can change the assignment of the operation element to avoid the overlap setting of the operation element.

[Reflection in Real Time of VF Video Generation by Change in Setting]

The user operates the respective operation elements assigned to the respective setting items regarding the focus assist function at the time of image pickup, to thereby change the luminance contrast of the second video signal display on the VF 16, the external display, and the like in real time. With this configuration, the user can select an optimal setting value in the focus adjustment by visual recognition.

That is, the control unit 17 respectively detects the state of each operation element individually assigned to each setting item regarding the focus assist function in the operation input unit 18. The control unit 17 generates each setting value corresponding to the detected state and sets it in the VF signal processing unit 15. The VF signal processing unit 15 generates a VF video signal on the basis of each setting value given by the control unit 17 and outputs it to the VF 16.

Next, a modified example according to the present technology will be described.

Modified Example 1

The focus assist information generation unit 152 may subtract an arbitrary value S as an absolute value from each piece of differential data a1, b1, c1, and d1 as shown below for the purpose of cancelling noise and generate pieces of focus assist information fa1', fb1', fc1', and fd1' by multiplying a gain α by each of pieces of differential data a1', b1', c1', and d1' from which the absolute value has been subtracted.

$|a1'|=|a1|-|S|$ $|b1'|=|b1|-|S|$ $|c1'|=|c1|-|S|$ $|d1'|=|d1|-|S|$

Modified Example 2

The focus assist information generation unit 152 may clip differential data a1 with an arbitrary value X as an absolute value for the purpose of reducing aliasing in subtraction of the arbitrary value S with respect to the pieces of differential data a1, b1, c1, and d1 as described below.

$|a1'|=|a1|-|S|$ if $|a1|\leq|X|$ $|a1'|=|X|-|S|$ if $|a1|>|X|$

The same applies to the other pieces of differential data b1, c1, and d1.

Application Example

The technology according to the present disclosure can be applied to various products. For example, the technology according to the present disclosure may be applied to an endoscopic surgery system.

Figure 16:
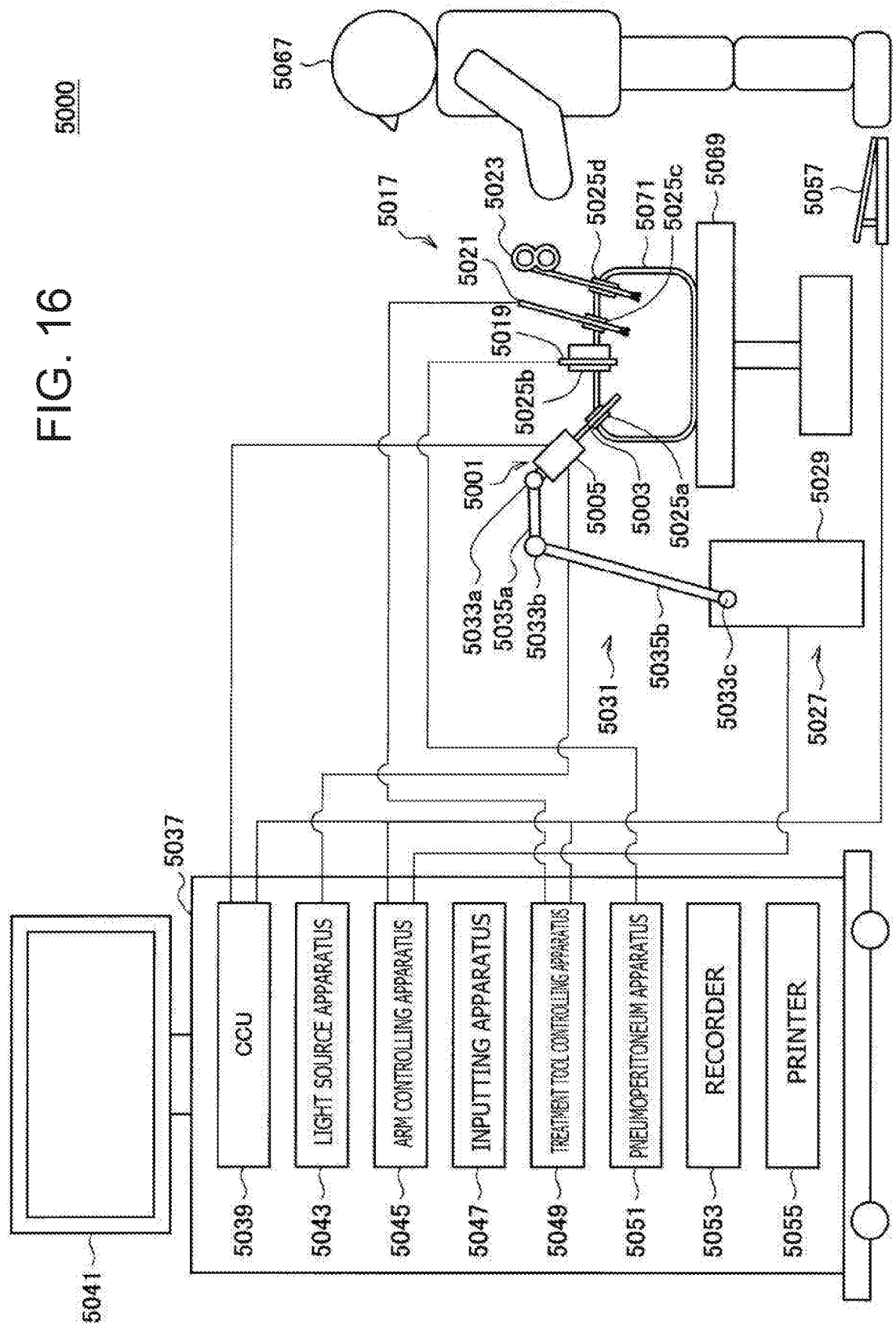
FIG. 16 A view depicting an example of a schematic configuration of an endoscopic surgery system.

FIG. 16 is a view depicting an example of a schematic configuration of an endoscopic surgery system 5000 to which the technology according to an embodiment of the present disclosure can be applied. In FIG. 16, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840×vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 16, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 17:
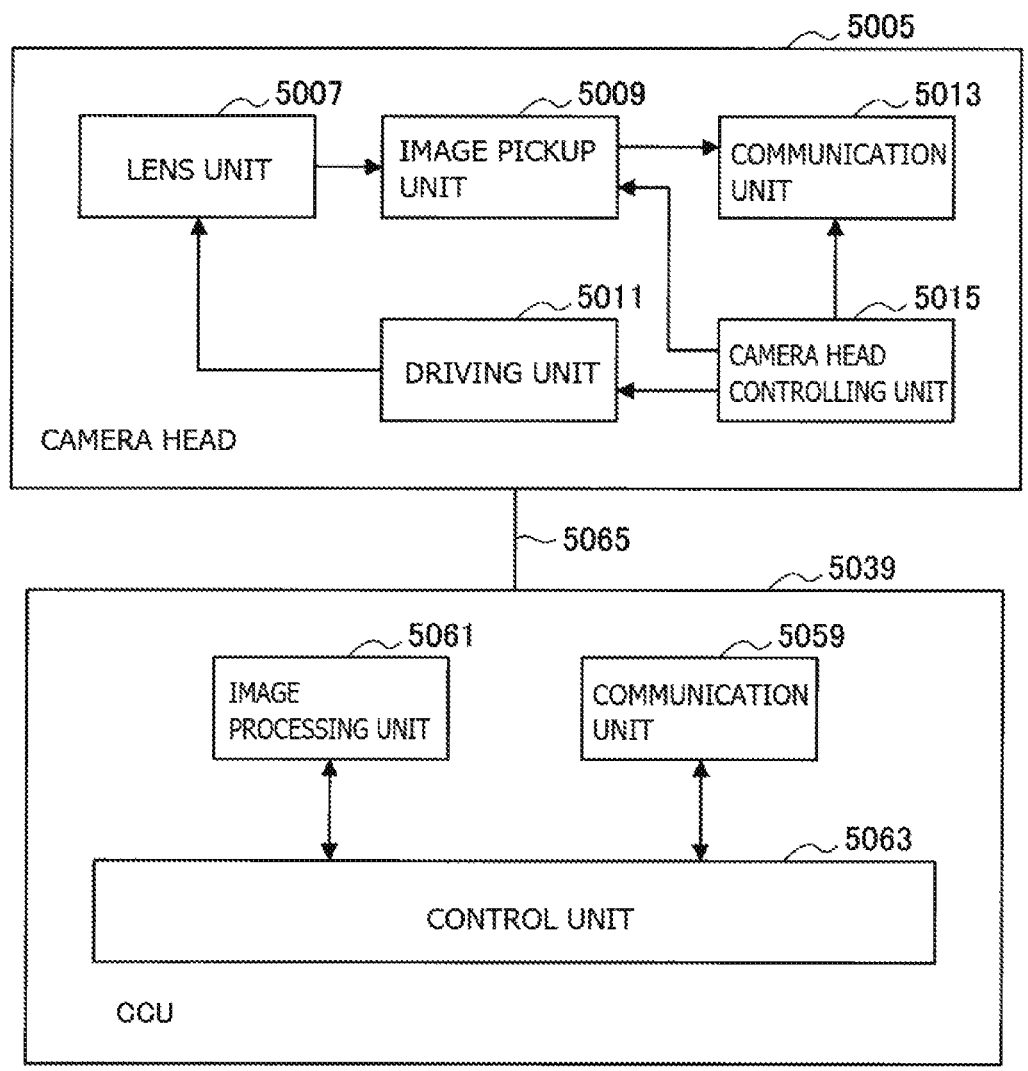
FIG. 17 A block diagram depicting an example of a functional configuration of a camera head and a camera control unit (CCU) depicted in FIG. 16.

Functions of the camera head 5005 of the endoscope 5001 and the CCU 5039 are described in more detail with reference to FIG. 17. FIG. 17 is a block diagram depicting an example of a functional configuration of the camera head 5005 and the CCU 5039 depicted in FIG. 16.

Referring to FIG. 17, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

Hereinabove, the example of the endoscopic surgery system 5000 to which the technology according to the present disclosure can be applied has been described. It should be noted that although the endoscopic surgery system 5000 is described here as an example, the system to which the technology according to the present disclosure can be applied is not limited to such an example. For example, the technology according to the present disclosure may be applied to a flexible endoscopic system for examination and a microscopic surgery system.

In a case of adding a second display apparatus having a screen resolution lower than that of the display apparatus 5041 to the above-mentioned configurations, the technology according to the present disclosure can be favorably applied in processing of generating, at the CCU 5039, an image to be displayed on the second display apparatus from the image captured by the camera head 5005. With this configuration, an image with the luminance contrast being further increased can be displayed on the screen of the second display apparatus having the lower screen resolution, focusing by the surgeon 5067 can be easily and accurately performed, and the surgery can be more safely and more reliably performed.

It should be noted that the present technology may also take the following configurations. (1) An image pickup apparatus, including:

an image pickup unit including an image pickup element;

a first video signal processing unit that generates a first video signal having a first resolution from a pixel signal obtained by the image pickup unit;

a second video signal processing unit that downconverts the first video signal generated by the first video signal processing unit to thereby generate a downconverted video signal having a second resolution lower than the first resolution, sets respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels, and individually adds a value according to differential data from an average luminance value of the center portion pixels in each region, which is a luminance representative value of the one or more center portion pixels corresponding to each pixel of the downconverted video signal, to a luminance value of a corresponding pixel of the downconverted video signal, to thereby generate a second video signal having the second resolution; and a view finder that displays the second video signal.

(2) The image pickup apparatus according to (1), in which the second video signal processing unit is configured to band-limit the first video signal and perform downconverting by pixel thinning.

(3) The image pickup apparatus according to (1) or (2), in which the luminance representative value includes an average value of luminances of one or more center portion pixels corresponding to each pixel of 2 horizontal×2 vertical pixels in the downconverted video signal.

(4) The image pickup apparatus according to any one of (1) to (3), in which the second video signal processing unit is configured to generate data, which is obtained by multiplying the differential data by a predetermined gain, as the value according to the differential data.

(5) The image pickup apparatus according to any one of (1) to (4), further including:

an operation element group including a first operation element capable of selecting the number of center portion pixels in a first axis direction as a first setting value and a second operation element capable of selecting the number of center portion pixels in a second axis direction as a second setting value; and a control unit that detects respective states of the first operation element and the second operation element at a time of image pickup and reflects the first setting value and the second setting value to an operation of the second video signal processing unit on the basis of the detection result in real time.

(6) The image pickup apparatus according to (5), in which the operation element group further includes a third operation element capable of selecting a value of the gain as a third setting value, and the control unit is configured to detect a state of the third operation element at the time of image pickup and reflect the third setting value to an operation of the second video signal processing unit on the basis of the detection result in real time.

(7) The image pickup apparatus according to (6), further comprising a user interface for assigning the first operation element, the second operation element, and the third operation element in the operation element group.

(8) The image pickup apparatus according to any one of (1) to (7), in which the second video signal processing unit is configured to calculate a value, which is obtained by multiplying data obtained by subtracting a certain value as an absolute value from each piece of differential data by a predetermined gain, as the value according to the differential data.

(9) The image pickup apparatus according to any one of (1) to (7), in which the second video signal processing unit is configured to clip each piece of differential data with an arbitrary value as an absolute value when subtracting a certain value as an absolute value from each piece of differential data.

(10) A video signal processing apparatus, including:

a first video signal processing unit that generates a first video signal having a first resolution from a pixel signal obtained by an image pickup apparatus; and a second video signal processing unit that downconverts the first video signal generated by the first video signal processing unit to thereby generate a downconverted video signal having a second resolution lower than the first resolution, sets respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels, and individually adds a value according to differential data from an average luminance value of the center portion pixels in each region, which is a luminance representative value of the one or more center portion pixels corresponding to each pixel of the downconverted video signal, to a luminance value of a corresponding pixel of the downconverted video signal, to thereby generate a second video signal having the second resolution.

(11) The video signal processing apparatus according to (10), in which the second video signal processing unit is configured to band-limit the first video signal and perform downconverting by pixel thinning.

(12) The video signal processing apparatus according to (10) or (11), in which the luminance representative value includes an average value of luminances of one or more center portion pixels corresponding to each pixel of 2 horizontal×2 vertical pixels in the downconverted video signal.

(13) The video signal processing apparatus according to any one of (10) to (12), in which the second video signal processing unit is configured to generate data, which is obtained by multiplying the differential data by a predetermined gain, as the value according to the differential data.

(14) The video signal processing apparatus according to any one of (10) to (13), further including:

an operation element group including a first operation element capable of selecting the number of center portion pixels in the first axis direction as a first setting value and a second operation element capable of selecting the number of center portion pixels in the second axis direction as a second setting value; and a control unit that detects respective states of the first operation element and the second operation element at a time of image pickup and reflects the first setting value and the second setting value to an operation of the second video signal processing unit on the basis of the detection result in real time.

(15) The video signal processing apparatus according to (14), in which the operation element group further includes a third operation element capable of selecting a value of the gain as a third setting value, and the control unit is configured to detect a state of the third operation element at the time of image pickup and reflect the third setting value to an operation of the second video signal processing unit on the basis of the detection result in real time.

(16) The video signal processing apparatus according to (15), further including a user interface for assigning the first operation element, the second operation element, and the third operation element in the operation element group.

(17) The video signal processing apparatus according to any one of (10) to (16), in which the second video signal processing unit is configured to calculate a value, which is obtained by multiplying data obtained by subtracting a certain value as an absolute value from each piece of differential data by a predetermined gain, as the value according to the differential data.

(18) The video signal processing apparatus according to any one of (10) to (16), in which the second video signal processing unit is configured to clip each piece of differential data with an arbitrary value as an absolute value when subtracting a certain value as an absolute value from each piece of differential data.

(19) A video signal processing method, including:

generating, by a first video signal processing unit, a first video signal having a first resolution from a pixel signal obtained by an image pickup apparatus; and downconverting, by a second video signal processing unit, the first video signal generated by the first video signal processing unit to thereby generate a downconverted video signal having a second resolution lower than the first resolution, setting respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels, and individually adding a value according to differential data from an average luminance value of the center portion pixels in each region, which is a luminance representative value of the one or more center portion pixels corresponding to each pixel of the downconverted video signal, to a luminance value of a corresponding pixel of the downconverted video signal, to thereby generate a second video signal having the second resolution.

(20) The video signal processing method according to (19), in which the second video signal processing unit band-limits the first video signal and perform downconverting by pixel thinning.

(21) The video signal processing method according to (19) or (20), in which the luminance representative value includes an average value of luminances of one or more center portion pixels corresponding to each pixel of 2 horizontal×2 vertical pixels in the downconverted video signal.

(22) The video signal processing method according to any one of (19) to (21), in which the second video signal processing unit generates data, which is obtained by multiplying the differential data by a predetermined gain, as the value according to the differential data.

(23) The video signal processing method according to any one of (19) to (22), in which the control unit detects respective states of a first operation element capable of selecting the number of center portion pixels in the first axis direction as a first setting value and a second operation element capable of selecting the number of center portion pixels in the second axis direction as a second setting value and reflects the first setting value and the second setting value to an operation of the second video signal processing unit on the basis of the detection result in real time.

(24) The video signal processing method according to any one of (19) to (23), in which the control unit detects respective states of a first operation element capable of selecting the number of center portion pixels in the first axis direction as a first setting value, a second operation element capable of selecting the number of center portion pixels in the second axis direction as a second setting value, and a third operation element capable of selecting a value of the gain as a third setting value and reflects the first setting value, the second setting value, and the third setting value to an operation of the second video signal processing unit on the basis of the detection result in real time.

(25) The video signal processing method according to (24), in which the control unit provides a user with a user interface for assigning the first operation element, the second operation element, and the third operation element in the operation element group.

(26) The video signal processing method according to any one of (19) to (25), in which the second video signal processing unit calculates a value, which is obtained by multiplying data obtained by subtracting a certain value from each piece of differential data as an absolute value by a predetermined gain as the value according to the differential data.

(27) The video signal processing method according to any one of (19) to (25), in which the second video signal processing unit clips each piece of differential data with an arbitrary value as an absolute value when subtracting a certain value as an absolute value from each piece of differential data.

REFERENCE SIGNS LIST

1 image pickup apparatus
11 optical block
12 image pickup unit
13 main-line video signal processing unit 14 output unit
15 VF signal processing unit
16 VF
17 control unit
18 operation input unit
151 downconverter
152 focus assist information generation unit
154 addition unit
156 difference calculation unit
157 gain unit

The invention claimed is:

1. An image pickup apparatus, comprising:
an image pickup unit including an image pickup element;
a first video signal processing unit configured to generate a first video signal having a first resolution from a pixel signal obtained by the image pickup unit;
a second video signal processing unit configured to:
downconvert the first video signal generated by the first video signal processing unit to thereby generate a downconverted video signal having a second resolution lower than the first resolution;
set respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels; and
individually add a value according to differential data from an average luminance value of the center portion pixels in each region, which is a luminance representative value of at least one center portion pixel of the center portion pixels corresponding to each pixel of the downconverted video signal, to a luminance value of a corresponding pixel of the downconverted video signal, to thereby generate a second video signal having the second resolution; and
a view finder configured to display the second video signal.

2. The image pickup apparatus according to claim 1, wherein
the second video signal processing unit is further configured to band-limit the first video signal and perform downconverting by pixel thinning.

3. The image pickup apparatus according to claim 1, wherein
the luminance representative value includes an average value of luminances of the at least one center portion pixel of the center portion pixels corresponding to each pixel of 2 horizontal×2 vertical pixels in the downconverted video signal.

4. The image pickup apparatus according to claim 3, wherein
the second video signal processing unit is further configured to calculate a value, which is obtained by multiplying data obtained by subtracting a certain value as an absolute value from each piece of the differential data by a predetermined gain, as the value according to the differential data.

5. The image pickup apparatus according to claim 3, wherein
the second video signal processing unit is further configured to clip each piece of the differential data with an arbitrary value as an absolute value when subtracting a certain value as the absolute value from each piece of the differential data.

6. The image pickup apparatus according to claim 1, wherein
the second video signal processing unit is further configured to generate data, which is obtained by multiplying the differential data by a predetermined gain, as the value according to the differential data.

7. The image pickup apparatus according to claim 6, further comprising:
an operation input unit including at least one operation element configured to receive a first operation by a user; and
a control unit configured to:
detect a state of the at least one operation element at a time of image pickup; and
reflect setting information based on the first operation to a second operation of the second video signal processing unit in real time.

8. The image pickup apparatus according to claim 7, wherein
the setting information includes a value of the predetermined gain as a third setting value.

9. The image pickup apparatus according to claim 7, further comprising a user interface configured to set assignment of the setting information to the at least one operation element.

10. The image pickup apparatus according to claim 1, further comprising:
an operation input unit including at least one operation element configured to receive a first operation by a user; and
a control unit configured to:
detect a state of the at least one operation element during image pick up; and
reflect setting information based on the first operation to a second operation of the second video signal processing unit in real time.

11. The image pickup apparatus according to claim 10, wherein
the setting information includes a number of the center portion pixels in a first axis direction as a first setting value and a number of the center portion pixels in a second axis direction as a second setting value.

12. The image pickup apparatus according to claim 10, wherein
the setting information is a number of the center portion pixels.

13. The image pickup apparatus according to claim 10, further comprising a user interface configured to set assignment of the setting information to the at least one operation element.

14. A video signal processing apparatus, comprising:
a first video signal processing unit configured to generate a first video signal having a first resolution from a pixel signal obtained by an image pickup apparatus; and
a second video signal processing unit configured to:
downconvert the first video signal generated by the first video signal processing unit to thereby generate a downconverted video signal having a second resolution lower than the first resolution;
set respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels; and individually add a value according to differential data from an average luminance value of the center portion pixels in each region, which is a luminance representative value of at least one center portion pixel of the center portion pixels corresponding to each pixel of the downconverted video signal, to a luminance value of a corresponding pixel of the downconverted video signal, to thereby generate a second video signal having the second resolution.

15. A video signal processing method, comprising:

generating, by a first video signal processing unit, a first video signal having a first resolution from a pixel signal obtained by an image pickup apparatus;

downconverting, by a second video signal processing unit, the first video signal generated by the first video signal processing unit to thereby generate a downconverted video signal having a second resolution lower than the first resolution;

setting, by the second video signal processing unit, respective pixels of 2 horizontal pixels or more×2 vertical pixels or more including respective pixels of a center portion in a region of 2N horizontal×2N vertical pixels (N is a power of 2 which is equal to or larger than 2) of the first video signal, which correspond to 2 horizontal×2 vertical pixels of the downconverted video signal, as center portion pixels; and individually adding, by the second video signal processing unit, a value according to differential data from an average luminance value of the center portion pixels in each region, which is a luminance representative value of at least one center portion pixel of the center portion pixels corresponding to each pixel of the downconverted video signal, to a luminance value of a corresponding pixel of the downconverted video signal, to thereby generate a second video signal having the second resolution.

* * * * *